United States Patent [19]

Marshall

[11] Patent Number: 5,168,579
[45] Date of Patent: Dec. 8, 1992

[54] RAINWEAR PARTICULARLY WELL SUITED FOR AN INFANT SEATED IN A STROLLER

[76] Inventor: Katherine J. Marshall, One Hudson St., New York, N.Y. 10013

[21] Appl. No.: 687,448

[22] Filed: Apr. 18, 1991

[51] Int. Cl.⁵ ............................................. A41D 3/08
[52] U.S. Cl. ............................................. 2/88; 2/84; 2/80; 2/85; 2/89; 2/87; 2/DIG. 5
[58] Field of Search ............ 2/80, 84, 88, 85, 89, 2/87, DIG. 5

[56] References Cited

U.S. PATENT DOCUMENTS

| | | | |
|---|---|---|---|
| 1,274,938 | 8/1918 | Rosenberg | 2/84 |
| 1,802,807 | 7/1929 | Davis | 2/84 |
| 1,913,270 | 6/1933 | Fischer | 2/80 |
| 2,372,110 | 3/1945 | Noone | 2/87 |
| 2,651,781 | 9/1953 | Buchholz | 2/80 |
| 3,370,303 | 2/1968 | Templehof | 2/87 |
| 3,849,803 | 11/1974 | Connors | 2/84 |
| 4,606,078 | 8/1986 | Tkacsik | 2/84 |

Primary Examiner—Werner H. Schroeder
Assistant Examiner—Gloria Hale
Attorney, Agent, or Firm—Frishauf, Holtz, Goodman & Woodward

[57] ABSTRACT

A weather protective garment constructed to better protect an infant seated in a stroller from rain. The infant wears a poncho to which a cape has been attached in the back. The cape is sized to be drapable over the back of the stroller to keep rain from falling into the space between the infant and the back of the stroller, and then onto the stroller seat. This prevents water from pooling on the seat while, at the same time, maintaining the infant fully protected by the poncho.

14 Claims, 3 Drawing Sheets

5,168,579

RAINWEAR PARTICULARLY WELL SUITED FOR AN INFANT SEATED IN A STROLLER

BACKGROUND OF THE INVENTION

This invention is directed to a weather protective garment such as a raincoat and, in particular, to an improved poncho type of raincoat that is specially constructed to keep rainwater from collecting under an infant seated in a stroller.

A poncho is used as one type of raincoat to protect children in inclement weather. As shown in FIG. 1, poncho 1 is a cloak which when laid flat resembles a blanket with an opening 5 in the middle. The wearer's head is slipped through the opening, and the poncho then hangs down from the neck and shoulder area. A hood 4 can also be provided to protect the head. A poncho is comfortably worn whether the wearer is upright or seated. It is easy to put on and take off, and has an attractive appearance without having to be fitted to individual wearers.

Such a poncho is also used for infants. It should, therefore, provide protection even when the infant is seated in a stroller. The body is, of course, protected by the poncho regardless of whether the infant is standing, walking, or seated in the stroller. However, the stroller does present a unique problem because rainwater can fall directly, or slide off the poncho, into the space between the infant and the back support of the stroller. This water can pool on the stroller seat and will eventually seep through the infant's clothing. It is not advisable to prevent the rainwater from falling in the space between the infant and the stroller seat back by simply draping the back of the poncho over the seat back. This is because the top of the stroller seat back is typically higher than the infant's head. Consequently, by lifting the poncho high enough so that it can be draped over the seat back, this leaves the infant's body and the stroller seat exposed to slanting rain. Also, wind can blow into this uncovered area. Consequently, a poncho provides inadequate protection against rain under these circumstances. Other coverings are available which are particularly designed to cover an infant seated in a stroller. For example, one such covering is shaped to stretch from the front of the stroller and over the back seat. A hole is provided for the infant's head. Elastic around the border tightens the cover around the stroller. However, this type of cover cannot be worn when the infant is out of the stroller because the shape and construction are not comfortable and attractive. Also, it leaves the infant's back exposed. Consequently, the prior art provides no weather protective covering which is suitable to be comfortably and attractively worn while standing or walking and which also provides satisfactory protection from rain when the infant is seated in a stroller.

SUMMARY OF THE INVENTION

A primary object of the present invention is to provide a weather protective garment which can be conveniently worn by an infant while standing or walking and also provides satisfactory protection against rain when the infant is seated in a stroller.

A more particular object of the present invention is to provide a weather protective garment that can cover an infant seated in a stroller and which can be secured in such a manner that the wind does not lift it off the infant.

Another object of the present invention is to provide an attractive and comfortable weather protective garment that can protect an infant seated in a stroller from rain and which looks good and feels comfortable whether the infant is upright or seated in a stroller.

One other object of the present invention is to provide a weather protective garment which is reasonably priced and easy to fabricate relative to those currently available while providing the above-mentioned advantages.

These and other objects of the present invention are attained by a weather-protective garment adapted to be worn by an infant seated in a stroller having a back against which the seated infant can lean. It comprises a covering of flexible, weather-resisting material adapted to cover at least a substantial portion of the front and back of the seated infant. A cape is attached to such covering, and it overlays the back of the seated infant. The cape is specially adapted to extend over the back of the stroller.

Another aspect of the invention is directed to a weather-protective garment adapted to be worn primarily by an infant seated in a stroller which comprises a covering of flexible, weather-resisting material adapted to be draped over the seated infant while hanging down from the shoulder area, with a front portion of such covering being adapted to cover the body and legs of the seated infant. The front portion has, on the inside of the covering at one end thereof, a pocket adapted to accommodate the legs of the infant therein.

DETAILED DESCRIPTION OF THE PREFERRED EMBODIMENT

Figure 1:
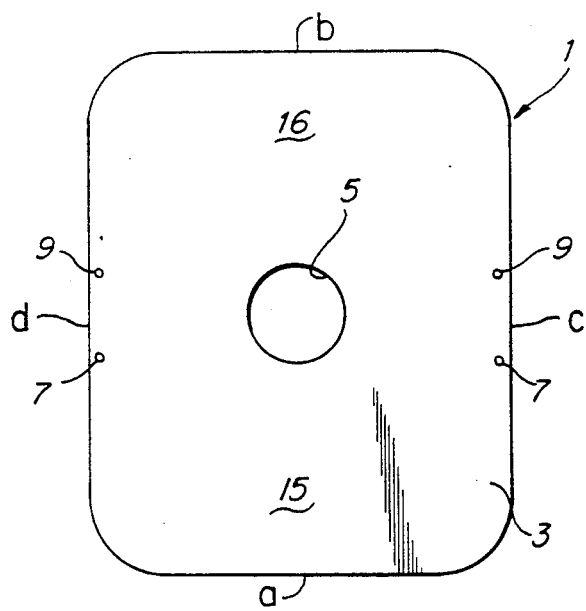
FIG. 1 shows a top view of a prior art poncho spread out on a flat surface.

FIG. 1 shows prior art poncho 1 spread out on a flat surface. It comprises a sheet 3 of suitable weather-resisting fabric such as nylon. At the center is an opening 5 through which the person can slip his head. Snaps 7 and 9 are provided to form "arm holes" as explained below. Above opening 5 is a hood suitably sewn in place (see FIGS. 2, 3). FIG. 1 shows locations on the poncho identified by the letters a, b, c and d. As poncho 1 is held taut at positions a and b, it will assume the shape shown in FIG. 2. If, on the other hand, poncho 1 is held taut at positions c and d, it will assume the shape depicted in FIG. 3. When poncho 1 is folded as shown in FIG. 3, it will readily be seen that snaps 9 are positioned opposite to snaps 7. These are designed to snap together. When that is done, an arm can be passed through the hole 11 (see FIG. 4) formed between the fastened snaps and fold 13 of the poncho. Thus, in the arrangement of FIG. 3, the visible half of poncho 1 will be considered as the front 15 of the poncho since it will cover the front of the person's body. The other half, 16, is shown in FIG. 1.

Figure 4:
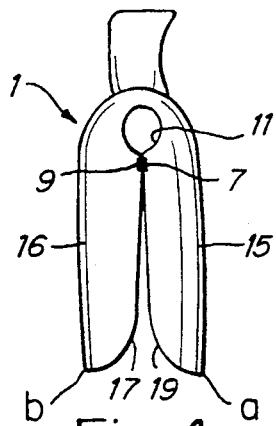
FIG. 4 is a view similar to FIG. 2, but with the poncho being worn by a person (not shown).

FIG. 4 shows how poncho 1 appears when it is worn by a person (not shown). FIG. 4 resembles FIG. 2, but the poncho is no longer held taut at positions a and b and, instead, these are allowed to drop so that the poncho drapes around the person's body. Arm hole 11 formed by snaps 7 and 9 is now clearly visible. Edges 17 and 19 are shown as separated by a space. In fact, however, this space will be minimal, and perhaps even non-existent, as the poncho falls into place.

Figure 2:
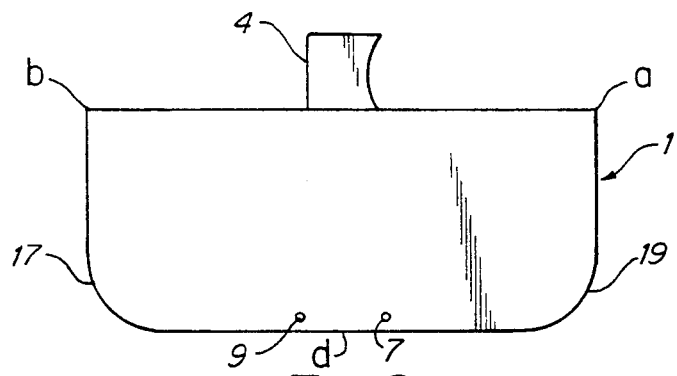
FIG. 2 shows an elevational side view of the prior art poncho of FIG. 1 held up at points a and b.
Figure 3:
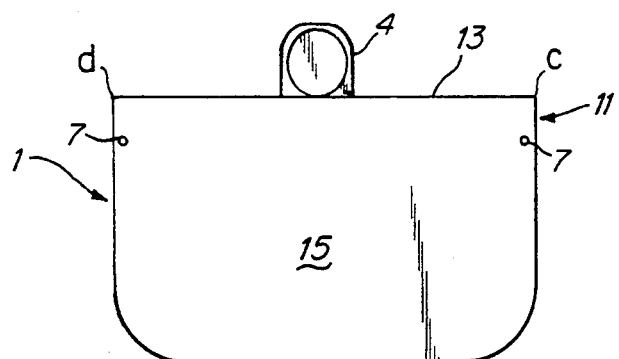
FIG. 3 shows an elevational front view of the poncho of FIG. 1 held up at points c and d.
Figure 5:
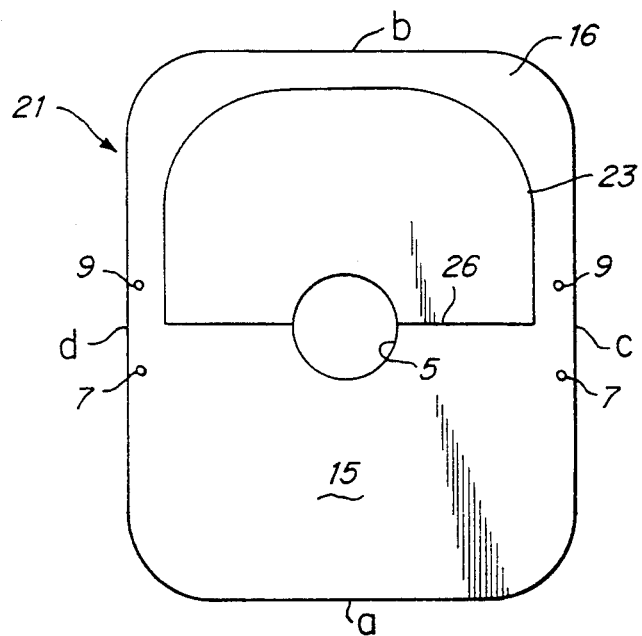
FIG. 5 shows a garment constructed in accordance with the present invention.
Figure 6:
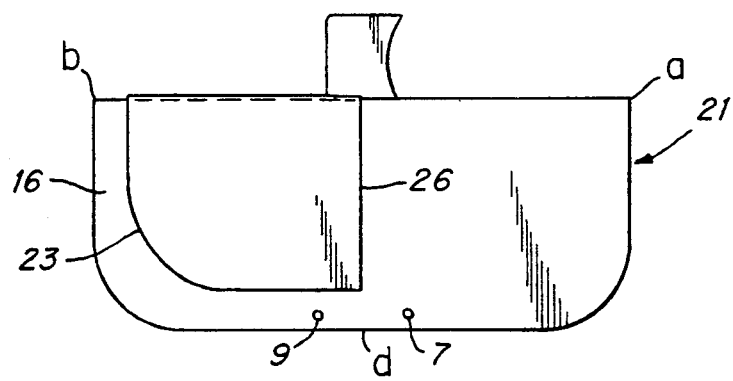
FIG. 6 shows an elevational side view of the garment of FIG. 5 held up at points a and b.
Figure 7:
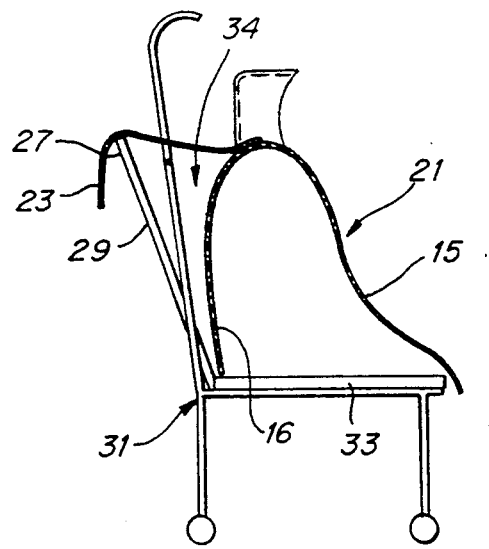
FIG. 7 shows a cross-sectional view of the garment of FIG. 5 as it is being worn by an infant, such as in FIG. 4, seated on a stroller.

Turning now to the present invention, FIGS. 5 and 6 show views similar to that of FIGS. 1 and 2, respectively. In FIG. 6, poncho 21 is held taut by its positions a and b corresponding to the like-identified positions in FIG. 2. However, FIG. 6 differs from FIG. 2 in having a cape 23 sewn to the poncho at seam 26 so as to cover at least a substantial part of back portion 16. Consequently, when the poncho is worn normally while the infant is standing or walking, for example, cape 23 will simply drop around the body in the same manner as the back portion 16 of poncho 21. When the infant is seated in the stroller, poncho 21 with its front and back portions 15 and 16 will drape around the infant in the normal fashion. However, as shown in FIG. 7, cape 23 can be pulled up from behind the infant and draped over the top 27 of back 29 of stroller 31. In this position it covers space 34 which may form between back 16 of poncho 21 and back 29 of stroller 31. Therefore, rain water is prevented from falling into space 34 or from rolling into it off poncho 21 and onto seat 33.

Poncho 21 constructed in accordance with the present invention thus provides a modified construction that is conveniently worn for standing or walking and, when worn, looks like a conventional poncho. A particularly significant advantage thereof is that poncho 21 also provides the desired protection for an infant seated in a stroller, as explained above, by virtue of the provision, placement and construction of cape 23 which, in a falling rain, is drapable over the back seat of the stroller. Thus, poncho 21 fully protects the infant with front and back portions 15 and 16 thereof against wind and slanting rain. At the same time, cape 23 keeps water from pooling underneath the infant, but without compromising the protection provided by the rest of poncho 21.

Figure 8:
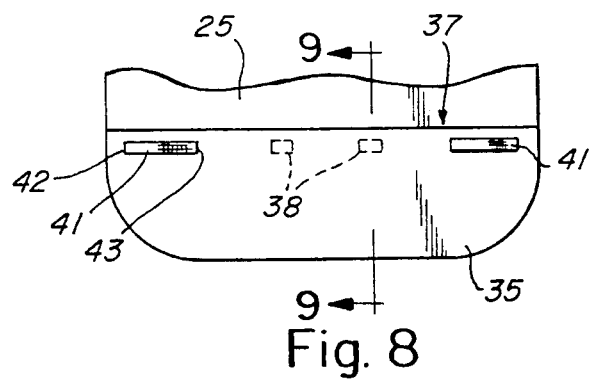
FIG. 8 shows an expanded elevational view of the front edge of the garment where it covers the lower leg or foot.
Figure 9:
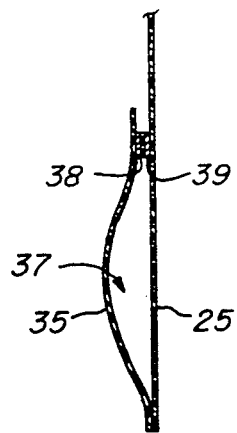
FIG. 9 shows a cross-sectional view taken along lines 9—9 in FIG. 8.

An additional aspect of the present invention involves the provision of a pocket in the vicinity of position a of poncho 21. This pocket is on the underside of front portion 15 so that it is accessible to the infant's feet. As best shown in FIGS. 8 and 9, a flap 35 is sewn to the underside of front portion 25 to form pocket 37. Opposed pairs 38 and 39 of Velcro tabs (or similar openable fastener) are provided to secure the pocket around the infant's feet once they are inserted within pocket 37. With the infant's feet accommodated within pocket 37, one can readily appreciate that front portion 25 of poncho 21 will not be vulnerable to being lifted up by the wind and exposing the infant to the elements. As an alternative to this manner of securing poncho 21 down, or perhaps complimentary thereto, elastic strips 41 are secured to flap 35 at sides 42 and 43 thereof. One end of the strips is sewn to flap 35, while the other end employs a Velcro fastener. These strips can be tightened onto any protruding portion of stroller 31 located lower than the seated infant so that the bottom of front end portion 25 is secured to the stroller. When this approach is used, it is not necessary to place the infant's feet into pocket 37 if this is not convenient or desired.

Although a preferred embodiment of the present invention has been disclosed in detail above, various modifications thereto will be readily apparent to one with ordinary skill in the art. For example, although cape 23 is permanently sewn to poncho 21, a temporary type of fastening arrangement can be utilized instead to permit removal of cape 23. It must be noted, however, that this fastening arrangement must be waterproof or, at the very least, water-resistant. A suitable zipper can be one such fastening arrangement. Also, the particular shape and size of cape 23 depicted in FIGS. 5 and 6 is a matter of design choice. In addition, the size and shape of cape 23 relative to the rest of poncho 21 is also a matter of design choice. Furthermore, various forms of pocket 37 and how it is constructed can be selected. Also, although the "arm holes" have been disclosed as being formed with snaps 7 and 9, any other type of openable closure means, such as a Velcro fastener, can be used. These and all other variations are intended to be included within the scope of the present invention as defined by the following claims.

I claim

1. A weather-protective garment for covering an infant seated in a stroller having a back against which the seated infant can lean, comprising:
    a covering of flexible, weather-resisting material shaped for covering at least a substantial portion of the front and back of said seated infant which is accommodated inside said covering, and
    a cape attached to, and outside of, said covering and overlying at least a portion of the back of said seated infant, said cape being sized to extend over the back of said stroller, whereby the thusly extended cape prevents rain from falling onto the seat of the stroller.

2. The garment of claim 1, further comprising an opening formed in said covering, said opening being sized to accommodate the infant's head.

3. The garment of claim 2, wherein said covering has front and back portions corresponding, respectively, to said front and back of the infant, said opening being between said front and back portions, said cape being attached to said covering along a line between said front and back portions of the covering, with such line corresponding to the shoulder area of the infant whose head is in said opening.

4. The garment of claim 3, further comprising a hood attached to said covering at said opening.

5. The garment of claim 3, wherein said cape is attached to said covering with a water resistant attachment.

6. The garment of claim 1, wherein said covering has a length dimension with a front portion at one end and a back portion at the other end and a width dimension between two opposite sides, said cape having a portion attached to said covering along a line extending between said opposite sides and with at least part of the cape other than said attached portion remaining unattached and normally overlying said back portion of said covering while being sized such as to be drapable over the back of said stroller.

7. The garment of claim 6, wherein said cape is attached to said covering at the shoulder area of said infant whose head is in an opening formed in said covering.

8. The garment of claim 8, wherein said cape is attached to said covering with a water resistant attachment.

9. The garment of claim 1, wherein said cape is attached to said covering with a water resistant attachment.

10. The garment of claim 1, wherein said covering includes a front portion for covering the body and legs of the seated infant, said front portion having, on the inside of said covering, a pocket to accommodate the legs of said infant therein.

11. The garment of claim 1, further comprising means for attaching the covering to a front part of said stroller.

12. A weather-protective garment to be worn primarily by an infant seated in a stroller, comprising,
   a covering of flexible, weather-resisting material for draping over said seated infant while said covering is hanging down from the shoulder area, and a front portion of said covering being shaped for covering the body and legs of the seated infant which is accommodated inside said covering; and
   said front portion having one end which includes, on the inside of said covering at said one end, a pocket sized to accommodate the legs of said infant therein.

13. The garment of claim 12, wherein said pocket includes means to secure said covering around the legs of said infant as they are accommodated in said pocket.

14. The garment of claim 12, further comprising fastening means attached to said pocket to secure said one end of the covering to said stroller.

* * * * *